United States Patent
Annamaa et al.

(10) Patent No.: US 7,126,546 B2
(45) Date of Patent: Oct. 24, 2006

(54) ARRANGEMENT FOR INTEGRATING A RADIO PHONE STRUCTURE

(75) Inventors: Petteri Annamaa, Oulunsalo (FI); Jyrki Mikkola, Kaustinen (FI)

(73) Assignee: LK Products Oy, Kempele (FI)

( * ) Notice: Subject to any disclaimer, the term of this patent is extended or adjusted under 35 U.S.C. 154(b) by 172 days.

(21) Appl. No.: 10/748,717

(22) Filed: Dec. 29, 2003

(65) Prior Publication Data

US 2004/0171404 A1    Sep. 2, 2004

Related U.S. Application Data

(63) Continuation of application No. PCT/FI02/00566, filed on Jun. 26, 2002.

(30) Foreign Application Priority Data

Jun. 29, 2001  (FI)  .................................. 20011400

(51) Int. Cl.
*H01Q 1/24*  (2006.01)

(52) U.S. Cl. .................... 343/702; 343/720; 455/575.7

(58) Field of Classification Search ................ 343/702, 343/720, 829, 846, 700 MS; 455/575.7, 455/550.1, 575.1
See application file for complete search history.

(56) References Cited

U.S. PATENT DOCUMENTS

| 6,922,471 B1 | 7/2005 | Marqvardsen et al. |
| 6,927,732 B1 | 8/2005 | Mahringer |

FOREIGN PATENT DOCUMENTS

| GB | 2 079 054 A1 | 1/1982 |
| WO | WO-00/30268 A1 | 5/2000 |
| WO | WO-00/38475 A2 | 6/2000 |
| WO | WO-01/15267 A1 | 3/2001 |
| WO | WO-02/50944 A1 | 6/2002 |

OTHER PUBLICATIONS

DATABASE WPI; Week 200163; Derwent Publications Ltd., London, GB; AN 2001-562109 abstract & JP 2001 217633 A (Nakamura, T. et al.) Aug. 10, 2001.

*Primary Examiner*—Michael C. Wimer
(74) *Attorney, Agent, or Firm*—Darby & Darby

(57) ABSTRACT

An arrangement designed for radio phones for integrating a mechanical structure of the antenna head of the phone. The mechanical structures of an antenna and a speaker of the radio phone are integrated so that a given planar component radiates both radio waves and sound waves. The radiator component (310) comprises a layer (315, 316) of a material, a shape of which can be controlled by means of a voltage. The sound waves, i.e. fluctuation of the air pressure are thus generated by causing the thickness or position of the layer to fluctuate according to the control voltage. The antenna head of the radio phone becomes more compact than in the prior art, and it takes up less space because the antenna and the speaker utilize same structural elements.

15 Claims, 4 Drawing Sheets

US 7,126,546 B2

ARRANGEMENT FOR INTEGRATING A RADIO PHONE STRUCTURE

This application is a Continuation of International Patent Application No. PCT/FI02/00566, filed Jun. 26, 2002, which published in English on Jan. 9, 2003 as WO 03/003506 A1.

The invention relates to an arrangement, designed especially for mobile phones, for integrating the mechanical structure of the antenna head of a mobile phone.

BACKGROUND OF THE INVENTION

As mobile phones are becoming smaller, all arrangements that help reduce their size are recommendable. As regards antennas, an advantageous solution is a PIFA type (planar inverted F-antenna) structure. It is effective with respect to its size, and it does not create a protruding part in the phone. In an ordinary mobile phone structure, there is provided a speaker at the same end with the antenna, according to FIG. 1. Figure shows a mobile phone MS including a circuit board 105, the top surface whereof is coated with a conductive layer. The conductive layer forms, among others, the ground plane of the antenna. A PIFA type antenna comprises a radiating plane 101 that is somewhat higher than the ground plane. Beside the radiating plane, there is a speaker capsule 102, from which the sound is led to apertures provided in the mobile phone shell.

SUMMARY OF THE INVENTION

The object of the invention is to realize the mechanical structure of that end of a radio phone where the antenna is installed in a novel and more advantageous way. The antenna structure according to the invention is characterized by what is set forth in the independent claim 1. Preferred embodiments of the invention are presented in the dependent claims.

The basic idea of the invention is as follows: In a radio phone, the antenna and the speaker/loudspeaker are integrated in their mechanical structure, so that a given planar component radiates both radio and sound waves. The radiator component contains a layer of material, the shape of which can be controlled by means of a voltage. Sound waves, or the air pressure fluctuation, is then generated by causing the layer thickness or position to fluctuate according to the control voltage. The antenna represents for instance the PIFA type. The feed conductor of the PIFA and one of audio conductors of the speaker are galvanically connected to one and the same conductor plane in the radiator component.

An advantage of the invention is that in an arrangement according to it, the antenna head of a radio phone becomes more compact than in the prior art, because the antenna and the speaker use same structural parts. Another advantage of the invention, for the same reason, is that the total space required by the antenna and the speaker is reduced.

BRIEF DESCRIPTION OF THE DRAWINGS

The invention is described in more detail below with reference to the appended drawings, where.

DETAILED DESCRIPTION OF THE INVENTION

Figure 1:
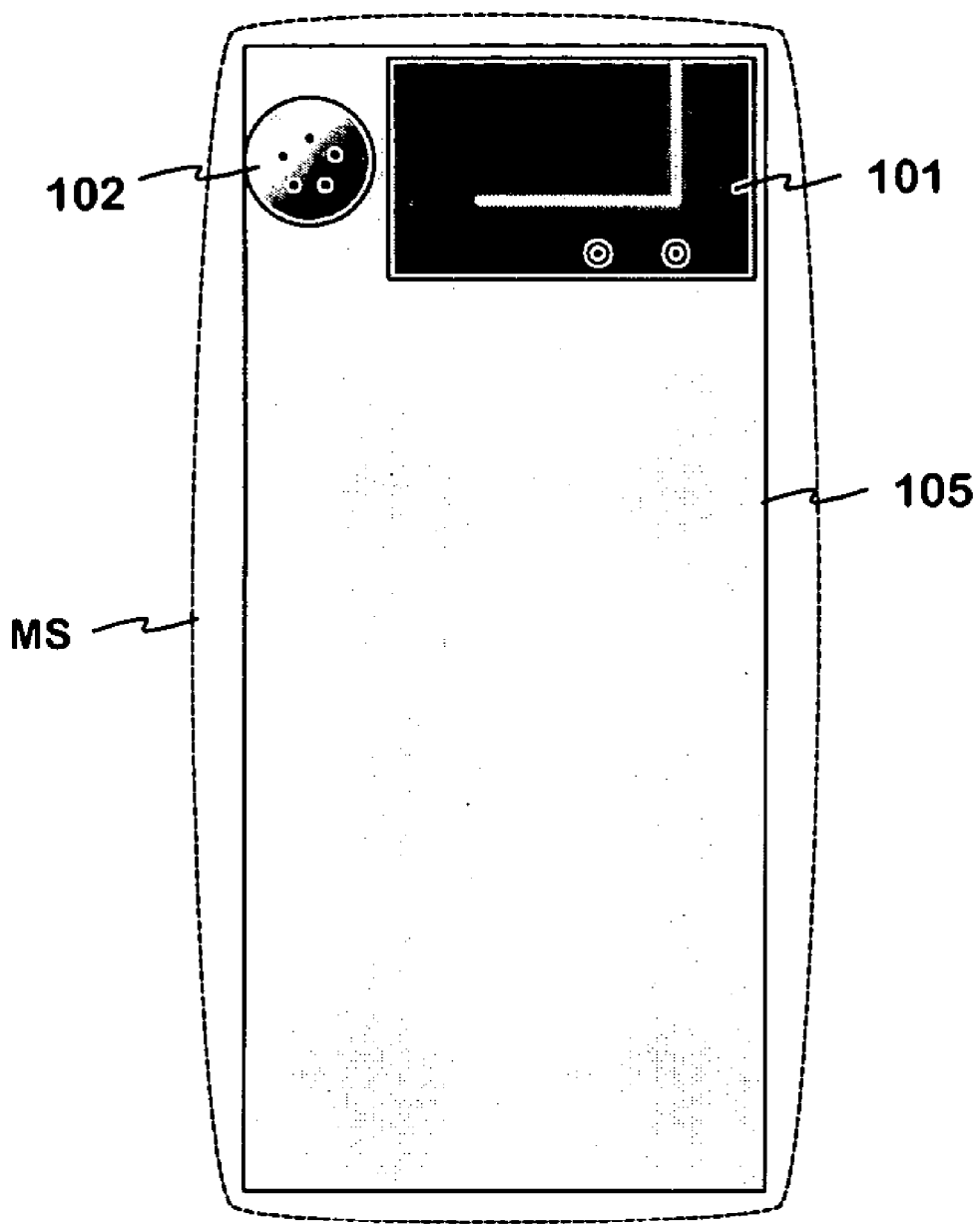
FIG. 1 shows an example of a prior art arrangement at the antenna head of a radio phone.
Figure 2A:
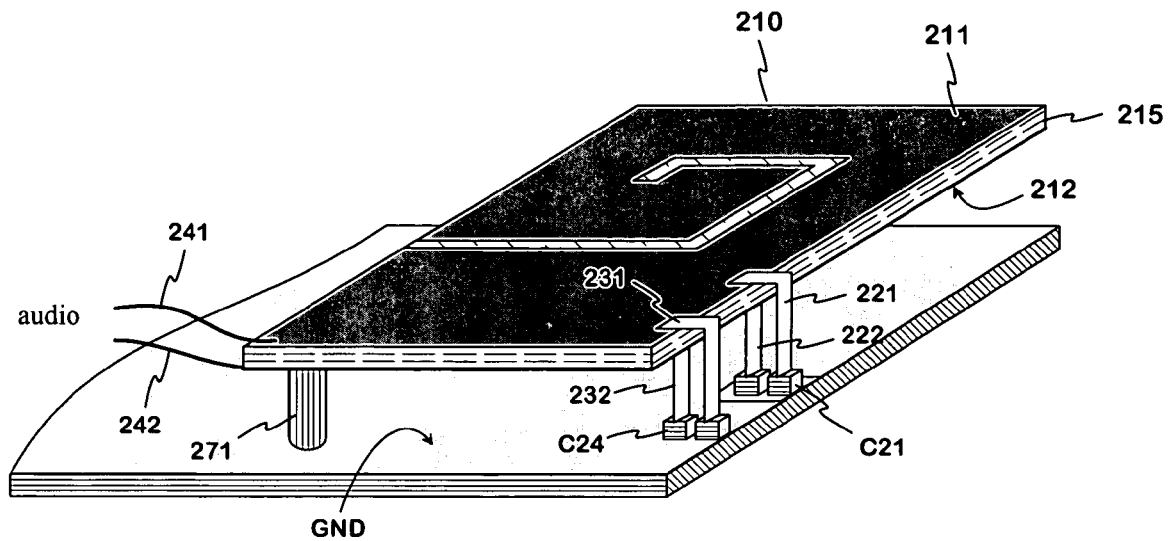
FIG. 2a shows an example of an arrangement according to the invention at the antenna head of a radio phone.

FIG. 2a shows an example of an arrangement according to the invention at the antenna head of a radio phone. The arrangement comprises a conductive ground plane GND and a radiator component 210 that is parallel with the ground plane. In this example, the radiator component is formed of an electret layer 215, the top surface whereof is coated with a first conductor plane 211 and the bottom surface whereof is coated with a second conductor plane 212. The radiator component 210 is supported against the ground plane (or against the circuit board underneath the ground plane) with insulating elements, such as an element 271.

In this description and in the claims, the prefix "top" refers to the opposite surface or side with respect to the ground plane, and the prefix "bottom" refers to the surface of side facing the ground plane. Respectively, a vertical direction means a direction that is perpendicular to the ground plane.

To the first conductor plane 211 there is connected a first feed conductor 221 and to the second conductor plane 212 at a same vertical line as the first feed conductor, there is connected a second feed conductor 222 of the antenna. Respectively, in another spot of the radiator component, in the first conductor plane there is connected a first short-circuit conductor 231 of the antenna, and in the second conductor plane 212 at a same vertical line as the first short-circuit conductor, there is connected a second short-circuit conductor 232 of the antenna. The second short-circuit conductor is connected to ground plane via a condensator C24. In a similar way, also the first short-circuit conductor and both the first and second feed conductors have a serial condensator. The feed conductors are connected, via the serial condensators, to the antenna port of a radio transmitter. The described structure serves as a PIFA type antenna, where instead of one radiating plane, there is a dual plane formed of a first and a second conductor plane. In the example of FIG. 2a, the first conductor plane 211 includes a slot that divides it, viewed from the feed point, into two branches of different lengths. The second conductor plane 212 is provided with a similar slot at the same location. Thus the PIFA is a dual-frequency antenna.

The electret layer 215 is for instance electromechanical film EMFi. The thickness of this type of film is reduced owing to the effect of an electric field. An inner static electric field can be generated in the material, which field causes a constriction of a given magnitude in the direction of the film thickness. External electric fields directed to this film cause additional changes. In the structure of FIG. 2a, these additional changes are provided with an audio signal. In the first conductor plane 211, there is connected, in addition to the aforementioned conductors, a first audio conductor 241, and in the second conductor plane 212 there is connected a second audio conductor 242. Consequently, the strength of the electric field affecting the electret layer can be made to fluctuate according to the audio signal. It is alternatingly higher and alternatingly lower than the strength of the inner field of the electret layer. Thus the radiator component 210 causes a fluctuation of pressure in the ambient air, said fluctuation corresponding to the audio signal. Thus the structure serves as a speaker or a loudspeaker.

Figure 2B:
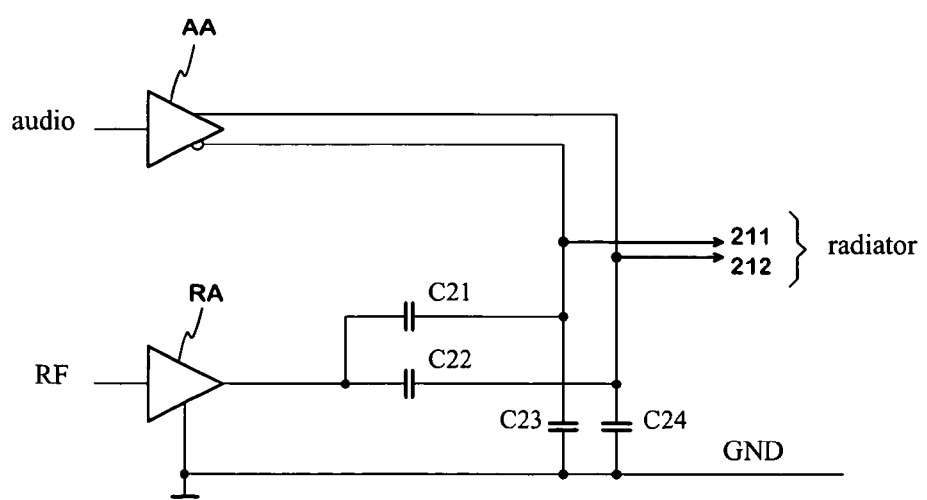
FIG. 2b is a circuit diagram showing a feed arrangement of the structure shown in FIG. 2a, FIG. 3a shows another example of an arrangement according to the invention at the antenna head of a radio phone.

FIG. 2b shows an example of a circuit diagram of the feed arrangement of the structure illustrated in FIG. 2a. In the figure is seen a terminal amplifier AA of the receiver's audio part, and a terminal amplifier RA of the radio transmitter. The output of the audio amplifier AA is connected to the conductor planes of the radiator component 210 in a balanced way, so that neither of the output conductors, i.e. audio conductors, is connected to ground. The "hot" conductor of the output of the radio-frequency amplifier RA is connected to the conductor planes of the radiator component capacitively via the condensators C21 and C22. Thus both of the conductor planes get a similar feed, but they are galvanically separated from each other. The galvanic separation is needed because of the audio feed. The drawing does not show other such elements between the amplifier RA and the antenna that are inessential from the point of view of the present invention. At the short circuit points, the conductor planes of the radiator component are connected to ground capacitively via the condensators C23 and C24. Also here the capacitive coupling is due to the galvanic separation of the conductor planes. The capacitances of the condensators C21–C24 are chosen so that their impedances are very high at audio frequencies, and very low at radio frequencies. The value of the capacitance is for example 1 nF. Thus the condensators C23 and C24 realize a short circuit only at very high frequencies.

The circuit of FIG. 2b is drawn from the point of view of the audio amplifier. The equivalent circuit of the radiator component depends on frequency. At radio frequencies, for example between the condensators C21 and C23, as well as between condensators C22 and C24, there prevails a given impedance. The whole radiator component represents a given sound radiation resistance at audio frequencies, and a given radio radiation resistance at radio frequencies. The impedances of the output conductors of the audio amplifier AA with respect to ground must at radio frequencies be arranged to be as high as possible in order to prevent the audio amplifier from remarkably affecting the antenna matching. Another possibility is to choose the location of the audio connection of the radiator component and to arrange the impedances of the output conductors of the audio amplifier with respect to ground so that the audio connection of the radiator component replaces the whole short circuit connection of the PIFA.

Figure 3A:
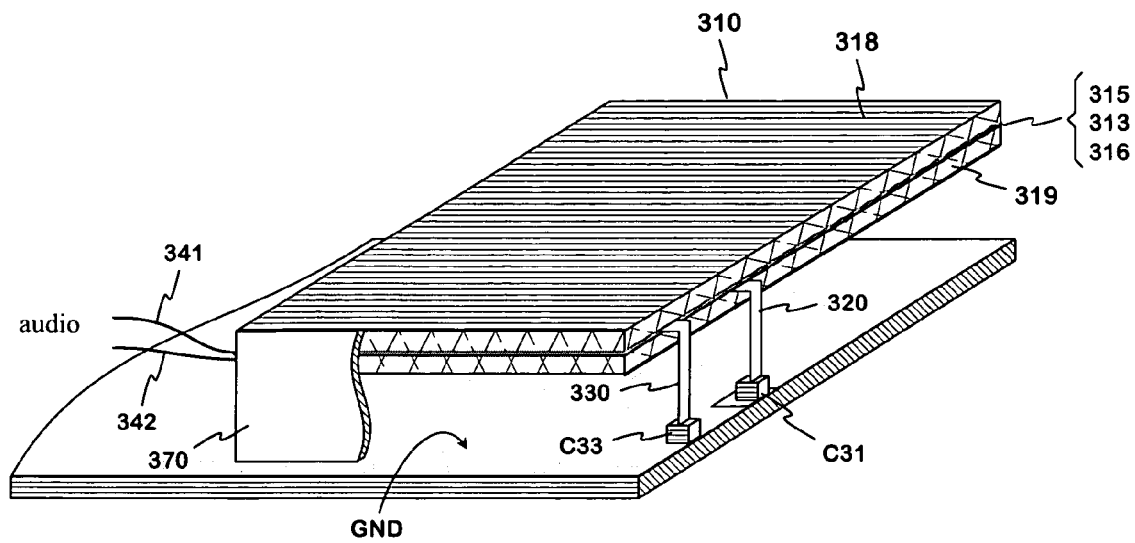
FIG. 3b shows a feed arrangement of the structure shown in FIG. 3a and a structure of the radiator component.
Figure 3B:
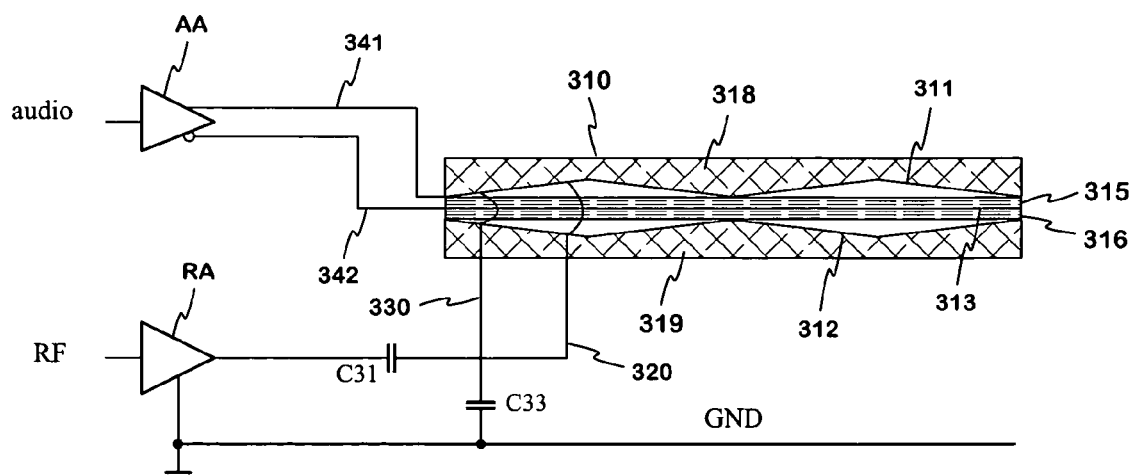

FIGS. 3a and 3b show another example of the arrangement according to the invention at the antenna head of a radio phone. The arrangement comprises a conductive ground plane GND and a radiator component 310 that is parallel with the ground plane. The inner structure of the radiator component appears from FIG. 3b, where it is illustrated as a longitudinal section. As a loudspeaker solution, the structure is known as such for instance from the article "ElectroMechanical Film—a new multipurpose electret material" [Sensors and Actuators 84 (2000), pp. 95–102].

In this example, in the middle of the radiator component 310, there are superimposed a first electret layer 315 and a second electret layer 316, between which layers there is a conductive film 313. In both electret layers, there is formed an inner vertical electric field, so that the directions of these fields are opposite. Above the first electret layer, there is a sound-permeable first support layer 318, made of a porous and flexible material. Respectively, underneath the second electret layer, there is a sound-permeable second support layer 319, made of a porous and flexible material. The surfaces of both support layers facing the electret layers are designed to be corrugated, so that said surfaces only touch the electret layers at a relatively small area. These corrugated inner surfaces are coated with a conductive material, so that there are created a first conductor plane 311 that is in contact with the first electret layer 315, and a second conductor plane 312 that is in contact with the second electret layer 316. The first and second conductor planes are provided with tiny perforations, so that even these layers are sound-permeable. The antenna feed conductor 320 is connected at a certain point to the first conductor plane 311, and also at the same vertical line to the second conductor plane 312. Respectively, the antenna short circuit wire 330 is connected at a certain point to the first conductor plane 311, and also at the same vertical line to the second conductor plane 312. Thus the structure serves as a PIFA type antenna, where instead of one radiating plane, there is a dual plane formed of the first and second conductor planes.

The first output conductor of the audio amplifier AA, i.e. the first audio conductor 341, is connected to the first and second conductor layer that are galvanically interconnected according to the description above. The second output conductor of the audio amplifier, i.e. the second audio conductor 342, is connected to the conductive film 313. When the output voltage of the audio amplifier is zero, the electret layers 315, 316 are in their middle position. When the output voltage of the audio amplifier deviates from than zero, the corresponding electric field strengthens the electric field of one electret layer and weakens the electric field of the other electret layer. Now the electrostatic force that draws the plane formed by the electret layers towards the first conductor layer 311 is for instance higher than the electrostatic force that draws the plane formed by the electret layers towards the second conductor layer 312. For this reason, said plane moves forward, until a force balance is reached. When the output voltage of the audio amplifier deviates from zero in the opposite direction, also the changes in the forces have opposite signs, and the plane formed by the electret layers moves downwards. Consequently, the motion of the plane 315, 313, 316 conforms to the fluctuations of the output voltage of the audio amplifier.

The radio-frequency amplifier RA is connected to the radiator component capacitively. In between the "hot" conductor of the audio amplifier output and the antenna feed conductor 320, there is a condensator C31, and between the ground plane GND and the antenna short-circuit conductor 330, there is a condensator C33. The impedances of the condensators are fairly low at radio frequencies, but fairly high at audio frequencies. Their purpose is to separate the amplifiers feeding the radiator component from each other. For the same reason, the impedance of at least the first output conductor 341 of the audio amplifier with respect to ground is relatively high.

In FIG. 3a, the radiator component 310 is at the edges supported against the plane provided underneath it by means of a dielectric frame 370, only a small part of which is illustrated in the drawing. Owing to the frame 370, there is formed a closed or nearly closed box, which is advantageous for the sound reproduction. Without said box, the radiator component would be shorted acoustically, particularly at low audio frequencies.

The conductor layers 311, 312 radiating electromagnetic energy can be provided with similar double/multiband arrangements as in the example of FIG. 2a.

Figure 4:
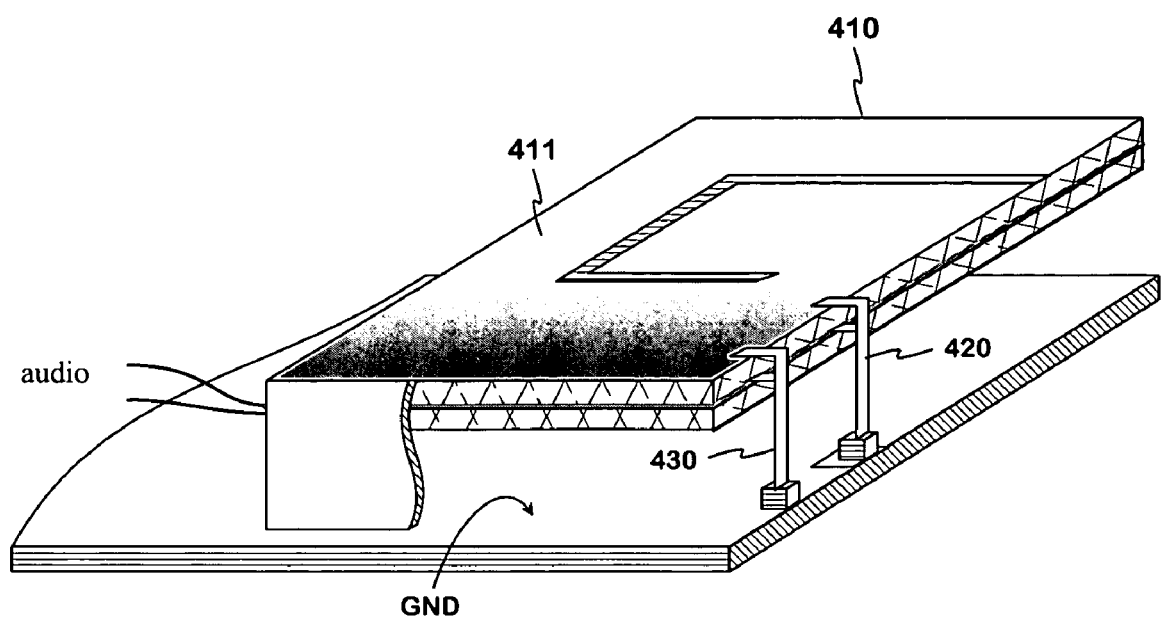
FIG. 4 shows a third example of an arrangement according to the invention at the antenna head of a radio phone.

FIG. 4 shows a third example of an arrangement according to the invention at the antenna head of a radio phone. For the most part, the arrangement is similar to the one shown in FIGS. 3a, 3b. The difference is that the top surface of the radiator component 410 is now coated with a sound-permeable conductor layer 411. This layer is galvanically connected to the antenna input conductor 420 and to the antenna short-circuit conductor 430 at the same vertical lines as the conductor layers inside the radiator component. Thus there is created a radio radiator that can be made better, as regards conductivity, than the conductor layers inside the component. In FIG. 4, in the conductor layer 411 there is drawn a slot starting from the edge thereof in order to form a double band antenna.

Figure 5:
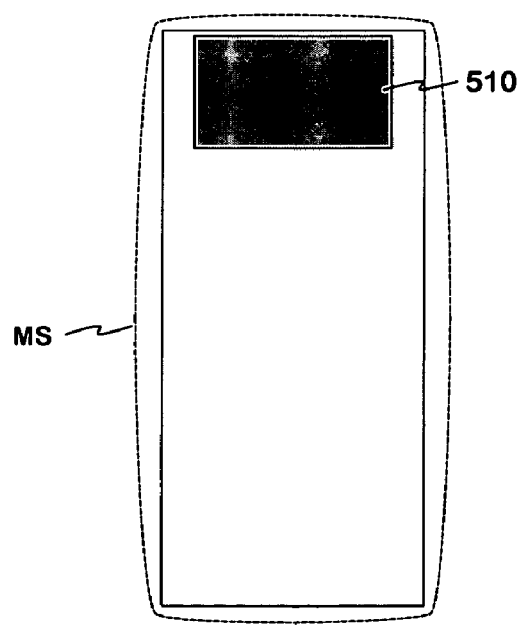
FIG. 5 shows an example of a radio phone provided with an arrangement according to the invention.

FIG. 5 shows a radio phone MS. It is provided with a radiator component 510, which according to the invention forms a substantial part of both the antenna and the loudspeaker.

In the above specification, we have described antenna head structures according to the invention. The invention is not limited just to these. The inventive idea can be applied in many ways within the scope of the independent claim 1.

The invention claimed is:

1. An arrangement for integrating a mechanical structure of an antenna head of a radio phone and a speaker, the mechanical structure including a ground plane, a planar antenna having at least one antenna feed conductor, and speaker first and second audio conductors, the arrangement comprising:
   a radiator component that is arranged to function both as a radio wave radiator for the planar antenna and as a sound wave radiator for the speaker; and
   said antenna feed conductor and one of said audio conductors being galvanically connected to a same conductor plane in the radiator component, wherein the conductor plane is short-circuited at a certain point to the ground plane to form a PIFA type antenna.

2. An arrangement according to claim 1, wherein the planar antenna has first and second feed conductors, and said radiator component comprises a planar layer of an electret material having a static inner electric field, a first conductor plane on its top surface and a second conductor plane on its bottom surface, the first conductor plane being connected to the first feed conductor and the first audio conductor, and the second conductor plane being connected to the second antenna feed conductor and the second audio conductor, and the first and second conductor planes being in a radio transmitting situation arranged to get an identical feed through said feed conductors.

3. An arrangement according to claim 1, wherein said radiator component comprises a first and second electret layer, which layers have opposite static inner electric fields, a conductive film between the first and second electret layer, a flexible and sound-permeable first support layer above the first electret layer, a flexible and sound-permeable second support layer underneath the second electret layer, a first conductor layer on the bottom surface of the first support layer and a second conductor layer on the top surface of the second support layer, said first conductor layer being in contact with the first electret layer, and said second conductor layer being in contact with the second electret layer, the antenna feed conductor being galvanically connected to the first and second conductor layer, the first audio conductor being connected to the first and second conductor layer and the second audio conductor being connected to said conductive film.

4. An arrangement according to claim 3, further comprising a dielectric frame around the radiator component and between the radiator component and ground plane to prevent an acoustic short of the speaker and to support the radiator component.

5. An arrangement according to claim 3, further comprising a radio radiator on the top surface of said radiator component.

6. An arrangement according to claim 2, said electret layer being the EMFi type.

7. An arrangement according to claim 3, said electret layers being the EMFi type.

8. A radio phone comprising:
   a planar antenna with a feed conductor;
   a speaker with two audio conductors;
   a radiator component arranged to function both as a radio wave radiator in the planar antenna and as a sound wave radiator in the speaker;
   said feed conductor and one of said audio conductors being galvanically connected to a first conductor plane in the radiator component; and
   a second conductor plane in the radiator component being short-circuited at a certain point to a ground plane to form a PIFA type antenna.

9. An arrangement for integrating a mechanical structure of an antenna head of a radio phone and a speaker, which structure comprises a ground plane, a planar antenna having first and second feed conductors, speaker first and second audio conductors, the arrangement comprising:
   a radiator component that is arranged to function both as a radio wave radiator for the planar antenna and as a sound wave radiator for the speaker;
   the radiator component including a planar layer of an electret material having a static inner electric field, a first conductor plane on its top surface and a second conductor plane on its bottom surface;
   the first conductor plane being connected to the first feed conductor and the first audio conductor;
   the second conductor plane being connected to the second antenna feed conductor and the second audio conductor;
   the first and second conductor planes being in a radio transmitting situation arranged to get an identical feed through said feed conductors; and
   said antenna feed conductor and one of said audio conductors being galvanically connected to a same conductor plane in the radiator component.

10. An arrangement according to claim 9, said second conductor plane of the radiator component being short-circuited at a certain point to the ground plane to form a PIFA type antenna.

11. An arrangement according to claim 9, wherein said radiator component comprises a first and second electret layer, which layers have opposite static inner electric fields, a conductive film between the first and second electret layer, a flexible and sound-permeable first support layer above the first electret layer, a flexible and sound-permeable second support layer underneath the second electret layer, a first conductor layer on the bottom surface of the first support layer and a second conductor layer on the top surface of the second support layer, said first conductor layer being in contact with the first electret layer, and said second conductor layer being in contact with the second electret layer, the antenna feed conductor being galvanically connected to the first and second conductor layer, the first audio conductor being connected to the first and second conductor layer and the second audio conductor being connected to said conductive film.

12. An arrangement according to claim 11, further comprising a dielectric frame around the radiator component and between the radiator component and ground plane to prevent an acoustic short of the speaker and to support the radiator component.

13. An arrangement according to claim 11, further comprising a radio radiator on the top surface of said radiator component.

14. An arrangement according to claim 9, said electret layer being the EMFi type.

15. An arrangement according to claim 11, said electret layers being the EMFi type.

* * * * *